(12) United States Patent
Govers et al.

(10) Patent No.: US 6,482,581 B1
(45) Date of Patent: Nov. 19, 2002

(54) COATED BASE PAPER FOR PHOTOGRAPHIC PRINTING PAPER

(75) Inventors: R. N. Govers, Tilburg; I. G. de Vries, Kaatsheuvel, both of (NL)

(73) Assignee: Fuji Photo Film B.V., Tilburg (NL)

( * ) Notice: Subject to any disclaimer, the term of this patent is extended or adjusted under 35 U.S.C. 154(b) by 0 days.

(21) Appl. No.: 09/291,739

(22) Filed: Apr. 14, 1999

(30) Foreign Application Priority Data

Apr. 23, 1998 (NL) .............................................. 1008979

(51) Int. Cl.⁷ .................................................. G03C 1/79
(52) U.S. Cl. ........................ 430/527; 430/533; 430/536; 430/538
(58) Field of Search ................................ 430/527, 533, 430/536, 538; 428/512, 513

(56) References Cited

U.S. PATENT DOCUMENTS

| | | |
|---|---|---|
| 4,994,357 A | 2/1991 | Uno et al. |
| 5,763,009 A * | 6/1998 | Kegasawa et al. ........... 427/366 |
| 5,888,683 A * | 3/1999 | Gula et al. ..................... 430/22 |

FOREIGN PATENT DOCUMENTS

| | | |
|---|---|---|
| DE | 3227 099 A1 | 2/1983 |
| DE | 32 27 099 | 2/1983 |
| EP | 0 285 146 A2 | 10/1988 |
| EP | 326 410 | 8/1989 |
| EP | 0 326 410 A2 | 8/1989 |
| EP | 662 633 | 7/1995 |
| EP | 0 662 633 A1 | 7/1995 |
| JP | 6-48365 | 6/1994 |

* cited by examiner

Primary Examiner—Janet Baxter
Assistant Examiner—Amanda C. Walke
(74) Attorney, Agent, or Firm—Merchant & Gould, P.C.

(57) ABSTRACT

The invention is directed to a paper support for photographic printing paper having a topside and a backside, at least said topside being provided with a pigmented coating based on clay and/or other pigment, said coating having a clay content of less than 3.3 g/m², which topside of the pigmented coating has an average surface roughness $R_A$ of 1.0 μm or less, and is provided with at least one pigmented polymer resin layer.

32 Claims, 1 Drawing Sheet

COATED BASE PAPER FOR PHOTOGRAPHIC PRINTING PAPER

Figure 1:
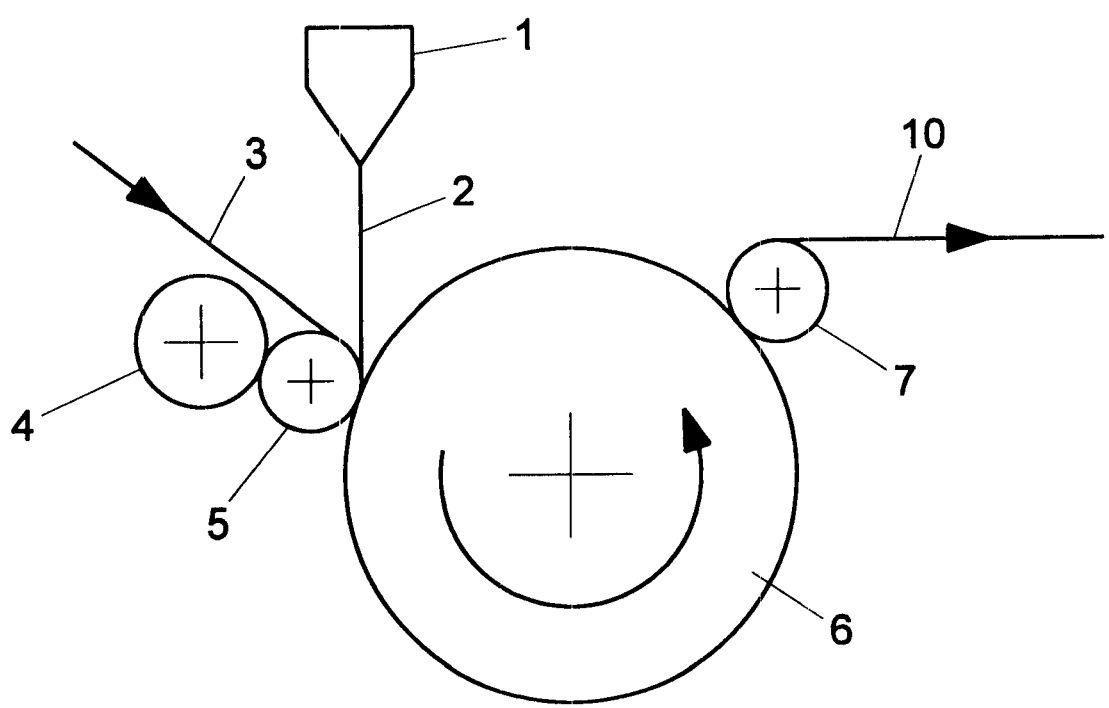

The present invention is directed to a base paper for photographic printing paper, comprising a base paper sheet and a metaloxide filled polymer resin coating. Further the invention is directed to a photographic printing paper at least consisting of such a base paper and a photographic emulsion on one side of the paper.

Base paper for photographic printing paper is conventionally prepared from a paper basis that is coated with a resin layer, usually a titanium oxide filled polyethylene, polypropylene or a polymethyl-methacrylate resin. An important aspect of the polymer resin coated base paper is the resin surface appearance, which should be smooth and not uneven and/or grainy. Further it is important that the resin surface does not have a large number of crater defects after melt-extrusion coating of resin on the base paper.

Further an important aspect of photographic printing paper is the speed of production and the thickness of the polyethylene layers. Both aspects are important in view of the economy of the process of producing the photographic printing paper. The formation of crater defects, or pits, has turned out to be strongly dependent on those aspects.

It has been attempted to increase the smoothness of the base paper by calendering the paper at high pressures between metallic rolls. A limitation of this method is that calendering will also reduce the thickness of the base paper and results in a decrease of whiteness and stiffness. Such a calender treatment is accordingly not really effective and creates other disadvantages. Also the calender treatment reduces the adhesion between the paper and the polymer resin, which has to be compensated by the use of adhesion promoting additives in the paper, or in an additional paper coating, or by further treatment of the paper.

It has also been attempted to suppress the crater defects by increasing the thickness of the polymer resin coating layer. At high extrusion speeds, such as over 300 m/min this is not sufficiently effective. Furthermore, it has economical disadvantages as the polymer resin is an important cost factor in the production of photographic printing paper.

In U.S. Pat. No. 4,994,357 it has been indicated, that increase of extrusion speeds above 100 m/min and more in particular above 150 m/min results in an increase of crater defects. According to this patent the use of paper having a low average surface roughness of $R_A < 1.0$ μm for the outer PE layer and a specific linear pressure of the nip rol in combination with a surface roughness of the base paper sheet, results in decreased crater formation. According to EP-A 285,146 it is possible to decrease crater defects at high extrusion linespeeds such as 200 m/min by injecting a high permeability gas, such as carbon dioxide at the air entrainment spot of the cooling roll.

At extrusion coating speeds of the polymer resin of 300 m/min or more it has been found to be much more difficult to reduce the number of crater defects. The above conventional methods did not lead to sufficiently high smoothness to be commercially acceptable.

In JP-B 06-048365 it has been disclosed to coat the base paper sheet followed by gloss calendering prior to the melt extrusion coating of titanium oxide filled polymer resin. According to this patent the gloss of the photographic paper is related to the gloss of the base paper. This latter value is improved by providing a pigmented surface coating at the base paper followed by a gloss supercalender treatment, prior to laminating with the titanium oxide filled polymer resin. The required high gloss value was achievable by providing more than 50 wt. % of kaolin in the pigmented surface coating.

In the art of providing photographic base paper there is a need for high speed production of the paper, especially during the (co-)extrusion of the paper with the polymer resin, whereby the amount of defects in the paper (pits or crater defects) remains at a sufficiently low value.

It is an object of the present invention to provide a pigment coated base paper that is suitable for preparing photographic printing paper with superior surface properties, i.e. a minimum amount of crater defects. It is a further object of the present invention to provide such a paper, that can be produced at very high production speed during melt extrusion-coating, without sacrifice to the surface properties.

It is yet another object of the present invention to produce a base paper that can be produced using a low thickness of polymer resin, expressed as weight of resin per surface area, more in particular produced at high extrusion speed, whereby good surface properties are maintained.

It is also an object of the invention to provide a photographic paper having a good whiteness and a good stiffness in combination with a good thickness of the base paper sheet.

The present invention is based on the surprising insight, that the paper web, having a surface roughness below a certain maximum level, can be melt-extrusion coated with a low amount (thin layer) of polymer resin at high speed, without detrimental effects to the properties of the final surface.

The present invention is directed to a paper support for photographic printing paper having a topside and a backside, at least said topside being provided with a pigmented coating based on clay and/or other pigments, said coating having a clay content of less than 3.3 g/m², which topside of the pigmented coating has an average surface roughness $R_A$ of 1.0 μm or less, and is provided with at least one pigmented polymer resin layer.

Surprisingly it has been found that it is possible to fine-tune the properties of a photographic base paper by the careful selection of the properties of the base sheet. More in particular the provision of the minimal surface roughness, in combination with a limited content of clay in the pigmented surface coating, provides the required combination of properties, such as the possibility to melt coat the paper with polymer resin at high speed, without an undue amount of crater defects, a good whiteness, a good stiffness in combination with a useful thickness of the base paper.

With the invention it has thus become possible to provide on the one hand a paper that can be produced at high speeds, without unacceptable crater defects. Further the invention provides a paper that has a good whiteness, a good stiffness and a useful thickness.

The invention is based thereon that the inventors have discovered, that the amount of crater defects occurring at high extrusion speeds, when pigments are applied in the coating with a limited amount of clay, is related to the average surface roughness of the coated base paper surface. More in particular the invention is based thereon, that when a coated base paper, having an average surface roughness of 1.0 μm or less, is used, it is possible to laminate the paper using very high (co-)extrusion speeds, without running into problems with crater defects in the surface of the paper. Keeping the said speeds at lower, but even at constant levels, the invention provides the possibility to reduce the amount of polymer resin, without having the crater defect problems.

The base paper to be used as the support for the photographic printing paper of the present invention is selected from materials conventionally used in photographic printing paper. Generally it is based on natural wood pulp and if desired, a filler such as talc, calcium carbonate, $TiO_2$, $BaSO_4$, and the like. Generally the paper also contains internal sizing agents, such as starch, alkyl ketene dimer, higher fatty acids, paraffin wax, alkenylsuccinic acid and the like. Further the paper may contain a reinforcing agent such as polyacrylamide or starch. Further additives in the paper can be fixing agents, such as aluminum sulfate, starch, cationic polymer and the like. In order to obtain especially good photographic printing paper usually short fibers are used in the natural pulp.

The base paper is prepared from the above components in a conventional way using known machinery. After laying the paper web and drying, a pigmented speed- or film-sizing treatment may be given with a coating solution containing a binder and a pigment. Examples of suitable binders are styrene-butadiene latex, methyl methacrylate-butadiene latex, polyvinyl alcohol, modified starch, polyacrylate latex and the like, as well as combinations thereof. Examples of pigments are calcium-carbonate, TiO2, BaSO4, clay, such as kaolin, styrene-acrylic copolymer, Mg—Al-silicate, and the like.

Application of this coating may be done by conventional methods such as a size-, film-press, speedsizer, bill-blade coater and the like. After this the paper can be dried. Depending on the quality thereof, it may be calendered. Good quality paper, having already the required surface roughness value, need not to be calendered; paper not having the required value, usually prepared from lesser quality material, will be subsequently calendered.

Depending on the quality of the base paper it may also have been coated with pigmented surface coating layers on top of the speed- or film-sizing surface, which may also contain pigments. This pigment surface coating layers can be coated on the paper without the speed- or film-sizing surface coating, too. The conventional base paper support for photographic applications are not pigment coated, as these superior quality papers are prepared from more bulky paper materials, having shorter fibres and better fibre-distribution. Accordingly they have a higher paper density, and do not need such a pigmented surface coating.

Pigment surface coating is most effective for low-quality papers and is done using conventional techniques such as a gate roll coater, a bill blade coater, an air knife coater, and the like.

The crater defects can be reduced by the usage of a pigment coating in the pigmented speed- or film-sizing treatment and/or the pigmented surface coating treatment.

By coating the paper surface with a pigmented speed-sizing coating and/or a pigmented surface coating, the surface roughness is significantly reduced. This means that the development of crater defects is significantly reduced.

Subsequently, the coated paper may be calendered. Preferably this type of calendering or "supercalendering", results in combination with the outer pigmented surface coating in a substantially reduced average surface roughness, $R_A$, which is determined at the top side of the surface of the coated base paper and should be 1.0 µm or less. When the average surface roughness exceeds the value of 1.0 µm, the crater defects are easily developed during extrusion coating.

Preferably the paper coating, paper structure and the optional calendering treatment are such that the paper surface has an average surface roughness $R_A$ of 0.8 µm or less, as it has been established that the amount of crater defects is reduced with decrease of average surface roughness.

According to another preferred embodiment the average surface roughness is not lower than 0.5 µm, as the thickness and stiffness qualities may become below an acceptable level, as in the prior art methods. However, in an other embodiment it is possible to have these values for the surface roughness, namely in case a good quality paper with sufficient bulk paper density is applied. With these type of papers the thickness and stiffness quality remain-within acceptable levels even with high level calendering, resulting in very low surface roughness values $R_A$, of 0.5 µm or less, which enables the lowest formation of crater defects during the (co)extrusion of the polymer resin.

Another aspect of the calendering treatment is the effect thereof on the paper thickness and accordingly on the stiffness. It is preferred to have a coated base paper with a total weight of at least 150 g/m², preferably between 150 and 210 g/m², in combination with a thickness of at least 145 µm, preferably between 150 and 180 µm. In these ranges an optimal combination of the various properties is obtained. The paper weight is defined herein as the weight of the base paper and any surface coating that may be present, however excluding the polymer resin and photographic emulsion.

In order to meet the requirements of the invention, the coating, if used should contain a minimal, preferably no, clay. The use of clay is objected to in view of the aim of obtaining a good initial whiteness as well as the whiteness stability after ageing, which becomes very difficult if clay is present. Whiteness values L*- and b*- of higher than 93.5 respectively lower than −1.2 are extremely difficult to obtain when high amounts of clay are present. According to the invention the upper limit of clay in the various layers is on the topside at most 3.3 g/m². In terms of whiteness of the paper it is preferred to have a value of less than 2, more preferred less than 1 g/m². In case less clay pigments are preferred in the pigmented coating recipe, the open pore structure of the base paper support has to be filled with an other pigment type, which has a better whiteness property than the clay pigments. In case not only the amount of crater defects has to be reduced but also the glossness of the base paper has to be improved, the inventors considered that the usage of high amounts of clay pigments (between 2 and 3.3 g/m²) might be effective. Some clay pigments have a plate-like geometrical shape which can be easily compressed at the base paper surface during the calendering process which is effective to improve the glossness quality. The overall whiteness with this higher clay content in the pigmented coating recipe is only feasible for the photographic application, if the poor whiteness of the clay pigments is compensated by adding other white pigments, such as titanium oxide, and/or by the use of blue dye and/or optical brighteners in the surface coating recipe and/or in the polymer resin.

One of the advantages of the invention resides therein that the texture of the base paper and/or the density of the paper fibers is less important for obtaining an even and less grainy appearance.

An important aspect of the present invention is the use of limited amounts of clay in the paper support. Usually clays such as china clay, kaolin, calcined clay and the like are used in the paper support. According to the invention the use of larger amounts of clay than 3.3 g/m² at the top side is unsuitable.

It is most preferred to apply a low quality base paper in which the top side of the pigmented coating has an average surface roughness $R_A$ of 0.5 µm or more and 0.8 µm or less and contain a clay content in the pigmented coating of less than 1 g/m².

The base sheet provided with the outer pigmented speed sizing and/or surface coating is further coated with a polymer resin filled with metal oxide. This coating is performed by (co-)extrusion using thin layer(s) of polymer, which can be applied at high speed. The resin at the front side of the photographic support may consist of a mono- or a multi-layer structure. The multi-layer structure can be obtained with stepwise extrusion of mono-layers or, preferably, in a co-extrusion coating system. If necessary, the front surface, and optionally also the back surface of the pigment coated base sheet is subjected to an activation treatment before and/or after the melt-extrusion process. The treatment may comprise a corona treatment and/or a flame treatment and/or ozone treatment and/or plasma treatment.

As polymer resin, homopolymers of α-olefins such as polyethylene, polypropylene and the like, copolymers of two or more olefins such as ethylene-propylene copolymer, ethylene butylene copolymer, ethylene octene copolymer and mixtures thereof can be applied. Particularly preferred polyolefins are high density polyethylene, low density polyethylene and mixtures thereof. In case the resin layer is of the multi-layer type, resins in each layer may differ from each other in chemical structure or in physical properties such as melt indexes.

The polymer resin layer will generally contain additives such as white pigment (metaloxide), dyes, coloured pigments, adhesion promoters, optical brighteners, antioxidant and the like. The polymer resin layer on the side on which a photographic emulsion is applied will preferably contain a white pigment and a coloured pigment or dyes.

The photographic printing paper is obtained by applying a photographic emulsion layer on the polymer resin coated paper. The application of the photographic emulsion can be done in any way and is well-known to the skilled person.

The paper support of the present invention can further also be used in papers for photo printing, using ink-jet or laser printing techniques.

As has been indicated before, one of the advantages of the invention resides therein that it becomes possible to apply less polymer resin than conventionally used, and/or to apply much higher extrusion speeds, in both cases without an unacceptable level of crater defects occurring. A polymer resin weight can be used up to 60 g/m² (for professional paper grade), but preferred resin ranges depend on the usage for specific market products (like professional or consumer markets and/or Glossy, Matte grades etc.). Conventionally, the polymer weight of a consumer paper grade varies between 30 and 35 g/m², whereas according to the invention less than 30, or even 15 to 25 g/m² may be used. The extrusion speeds for applying the polymer resin coating may be up to 200 m/min or more, without giving rise to unacceptable levels of crater defects. Preferred speeds for the extrusion may be up to 300 m/min or more.

The invention is also directed to a process for producing a base paper for photographic printing paper as described herein above, comprising providing a base paper web having a topside and a backside, applying a pigmented surface and/or speed-sizing coating, containing clay and/or other pigments, said coating having a clay content of less than 3.3 g/m² and/or other pigments to at least the topside of said web, to obtain an average surface roughness $R_A$ of 1.0 μm or less and applying at least one pigmented polymer resin layer on the topside of said base paper.

Further the invention is also directed to photographic printing paper consisting of the base paper and a photographic emulsion on the topside.

The invention is now elucidated on the basis of the attached drawing, wherein

FIG. 1 is a side view showing a conventional extrusion coating device in which a PE-type resin 2 is extruded in a film state onto a paper substrate 3 continuously fed in the arrow direction with an extrusion die 1 and brought into pressure contact with the substrate at a nip point between the nip roll 5 and a cooling roll 6. The nip roll 5 is backed up by a backup roll 4 to exert pressure on the nip roll 5 toward the cooling roll 6. The resultant cooled laminate 10 is removed from the cooling roll 6 by means of a releasing roll 7 after the laminated paper has travelled around the cooling roll over a length of a half to two thirds of the circumference thereof.

The invention is now further elucidated on the basis of the following examples.

EXAMPLES

In the Examples the following methods were used for determining the various parameters:

Adhesion: Zwick 1425 tensile tester, sample width 15 mm, peeling angle 180°, clamp distance 2.3 cm, peeling speed 50 mm/min.

Pits: Microscope per 4 mm²

Roughness: UBM;
 (1) Point density 500 P/mm
 (2) Area 5.6×4.0 mm²
 (3) Cut-off wavelength 0.80 mm
 (4) Speed 0.5 mm/sec.
according to DIN 4776; software package version 1.62

Whiteness: Minolta CM 1000, light condition D65 (daylight, including UV)/10° angle Stiffness: Lorenz&Wettre bending stiffness device; base paper at 7.5° bending angle; 1 cm clamp-sensor; measured in machine direction.

Thickness: Micrometer

Experiment 1

Comparative Sample #1

A high quality base paper, prepared using a starch based internal sizing agent which contains optical brightener, was used. The internal sized base paper is pre-calendered such that the bulk density and therefore in particular the surface density is increased. The surface is smoothened in order to close the pores at the surface preventing that the sizing solution will penetrate too deeply inside the paper bulk. Then, this was treated with a thermally modified non-ionic starch as speed sizing material. The starch was dispersed in an 1,8% (w/v) aqueous NaCl solution and heated at 120° C. for two hours under vigorous stirring. The viscosity (Brookfield at 100 rpm) of the speed-sizing solution ranges between 150–480 Mpa.s. After speed sizing and drying, the sample was finish-calendered until a bulk density ranging between 0.95–1.00 g/cm³ and the surface roughness $R_A \approx 1.2$ μm are achieved.

Invention Sample #1

The base paper of this example was prepared with the difference from the comparative sample #1 that in the speed sizing solution also a clay pigment (China clay pigment Supraflex 80 Lump) in amounts of 1.9 g/m² and a polyacrylic acid were included (Clay/starch 1/1 by wt. ratio; 0.3% w/w of polyacrylic acid to pigment).

After calendering the paper had an average surface roughness of 0.95 μm.

Invention Sample #2

The base paper of this sample was prepared with the difference from the comparative sample #1, that in the speed sizing solution a clay pigment in amounts of 3.0 g/m² and the addition of the blue dye fastusol were used.

Comparative Sample #2

The base paper of this sample was prepared with the difference from the comparative sample #1 that in the speed sizing solution, a clay pigment in amounts of 4.0 g/m² and the blue dye fastusol were used.

The papers of invention samples #1 and 2, as well as comparative sample #1 and 2, were tested for L* and b* whiteness values. The results are in the following table 1.

TABLE 1

| Sample | Pigment amount (g.m²) | Pigment type | Dye amount (mg/m²) | Dye type | Whiteness quality L* | b* |
|---|---|---|---|---|---|---|
| Comp. sample #1 | 0 | | 0 | | 94.0 | −4.0 |
| Inv. sample #1 | 1.9 | China clay | 0 | | 93.8 | −2.5 |
| Inv. sample #2 | 3.0 | China clay | 2.0 | blue | 93.8 | −2.5 |
| Comp. sample #2 | 4.0 | China clay | 3.5 | blue | 93.2 | −2.5 |

The whiteness of the samples containing not more than 2 g/m² clay are acceptable. In case of 3.0 g/m² clay, some amount of blue dye has to be added (Inv. sample #2) to get acceptable whiteness L* and b* values, because more amount of clay makes the paper too yellowish as compared with-the comparative sample #1 (based on the higher b* value).

In case of 4.0 g of clay, because the clay increases b* further, more amounts of blue dye have to be added (comparative sample #2) to obtain acceptable b* value, but in this case, L* becomes below an acceptable level (>93.5).

Experiment 2
Invention Sample #3

The same kind of paper was prepared as described for invention sample #2, however, with the usage of a different pigment (precipitated calcium carbonate (CaCO₃,RC-60) for an amount of 3 g/m². The paper had an average surface roughness of 0.75 μm.

A number of samples was extrusion coated at the topside with an LDPE monolayer extrusion coating of 29 g/m² at a linespeed of 300 m/min. The LDPE is melted at 315° C. with a nip roll pressure of 4.0 N/m² at a glossy cooling roll. The LDPE contains colouring agents, titanium dioxide and brightening agents. The backside of the base paper is extrusion coated with a transparent polyethylene melt. Before the polyethylene layers are extruded, the paper surface is first activated by Corona treatment in order to improve the adhesion between the paper surface and the polyethylene melt. The number of small and large crater defects was determined. The results are given in the following table 2.

TABLE 2

| Sample # | R$_A$ (μm) | 20–40 μm crater defects/4 mm² | >40 μm crater defects/4 mm² |
|---|---|---|---|
| Comp. #1 | 1.2 | 75 | 7 |
| Inv. #1 | 0.95 | 12 | 0 |
| Inv. #3 | 0.8 | 10 | 0 |

Because of the pigmented speed sizing, we can find that R$_A$ and the amount of crater defects reduce.

Experiment 3
Comparative Sample #3

A low quality base paper (buld density ≈0,95 g/cm³, R$_A$≈1.5 μm) was prepared using a starch based internal sizing solution, coated with an unpigmented starch based speed sizing, and calendered. It has a paper weight of 170 g/m². This was extrusion coated in the same way as the experiment 2.

Invention Sample #6

This sample was prepared in the same way as the comparative sample #3 with the difference that after the speed sizing, it was coated at the top side with 15 g/m² of a pigmented latex solution. The latex contained about 65 wt. % of CaCO₃ (1–2 μm average diameter) and 15 wt. % of CaCO₃ (<1.0 μm average diameter) and 20 wt. % of styrene butadiene binder. This base paper, thus obtained, had a total weight of 171 g/m².

Invention Sample #7

This sample was prepared in the same way as the invention sample #6 only with the difference that 15 wt. % of kaolin was used instead of the CaCO₃-grade with small size pigments.

Invention Sample #8

This sample was prepared in the same way as the invention sample #7 only with the difference that the super-calendering was used instead of normal calendering.

On those samples, the number of small and large crater defects and the surface roughness R$_A$ were measured. The results are given in the following table 3.

TABLE 3

| Sample # | R$_A$ (μm) | 20–40 μm crater defects/4 mm² | Stiffness (mN/15 mm) | Thickness (μm) |
|---|---|---|---|---|
| Comp. #3 | 1.50 | 55 | 295 | 163 |
| inv. #6 | 0.72 | 20 | 250 | 155 |
| inv. #7 | 0.65 | 17 | 261 | 164 |
| inv. #8 | 0.25 | 4 | 143 | 125 |

Because of the pigmented surface cotating, we can find that R$_A$ and the amount of crater defects reduce. We can find that the lower R$_A$ value results in the lower amount of crater defects. In the inventive sample #8, because of supercalendering, the stiffness and the thickness values become lower. These values are not preferable in the normal usage of photographic base paper.

What is claimed is:

1. Paper support for photographic printing paper comprising base paper having a topside and a backside, at least said topside of said base paper being provided with a pigmented coating comprising at least one of clay and another pigment, said pigmented coating having a clay content of less than 3.3 g/m², wherein a topside of the pigmented coating has an average surface roughness R$_A$ of 1.0 μm or less, and at least one pigmented polymer resin layer is provided over said pigmented coating, wherein the total weight of the coated base paper is at least 150 g/m².

2. Paper support according to claim 1, wherein the pigmented coating has a clay content of less than 2 g/m².

3. Paper support according to claim 1, wherein the pigmented coating has a clay content between 2 and 3.3 g/m², the pigmented coating further comprising a whiteness compensation.

4. Paper support according to claim 3, wherein the whiteness compensation is obtained by adding at least one of white pigments, blue dye and optical brighteners in at least one of the pigmented coating and the polymer resin coating.

5. Paper support according to claim 2, wherein the pigmented coating has a clay content of less than 1 g/M².

6. Paper support according to claim 1, wherein the topside of the pigmented coating has an average surface roughness R$_A$ of 0.8 μm or less.

7. Paper support according to claim 1, wherein the topside of the pigmented coating has an average surface roughness R$_A$ between 0.5 μm and 0.8 μm.

8. Paper support according to claim 1, wherein the polymer resin layer has a weight of less than 60 g/m².

9. Paper support according to claim 1, wherein the total weight of the base paper is between 150 and 210 g/m$^2$.

10. Paper support according to claim 1, wherein the base paper has a thickness of at least about 145 μm.

11. Paper support according to claim 1, wherein the base paper has a thickness of between 150 and 180 μm.

12. Paper support according to claim 1, wherein the base paper has been calendered before or after applying a coating to the base paper.

13. Paper support according to claim 1, wherein the base paper has been provided with a pigmented surface coating.

14. Paper support according to claim 13, wherein the pigmented surface coating comprises binder and pigment.

15. Paper support according to claim 14, wherein the pigment is selected from the group consisting of $CaCO_3$, $TiO_2$, $BaSO_4$, clay, magnesium-aluminium silicate, styrene-acrylic copolymers and combinations thereof.

16. Paper support according to claim 14, wherein the binder is selected from the group consisting of a styrene-butadiene latex, methyl methacrylate-butadiene latex, polyacrylate latex, polyvinyl alcohol, polysaccharide, and combinations thereof.

17. Paper support according to claim 16, wherein the binder is starch.

18. Paper support according to claim 1, wherein the base paper has been provided with a pigmented speed sizing coating.

19. Paper support according to claim 18, wherein the speed sizing coating comprises binder and pigment.

20. Paper support according to claim 19, wherein the pigment is selected from the group consisting of $CaCO_3$, $TiO_2$, $BaSO_4$, clay, magnesium-aluminum silicate, styrene-acrylic copolymers and combinations thereof.

21. Paper support according to claim 19, wherein the binder is selected from the group consisting of a styrene-butadiene latex, methyl methacrylate-butadiene latex, polyacrylate latex, polyvinyl alcohol, polysaccharide, and combinations thereof.

22. Paper support according to claim 21, wherein the binder is starch.

23. Paper support according to claim 1, wherein the polymer resin is selected from the group consisting of polyethylene resin, polypropylene resin and polymethylmethacrylate resin and combinations thereof.

24. Paper support according to claim 23, wherein the polymer resin is a polyethylene resin.

25. Paper support according to claim 1, wherein the polymer resin is filled with titanium dioxide.

26. Paper support according to claim 1, wherein the polymer resin coating has been applied using a paper speed of at least 200 m/min.

27. Paper support according to claim 26, wherein the polymer resin coating has been applied using a paper speed of at least 300 m/min.

28. Photographic printing paper comprising a base paper according to claim 1, and a photographic emulsion on at least one side thereof.

29. Process for producing a paper support for photographic printing paper, the process comprising:

providing a base paper web having a topside and a backside;

applying at least one of a pigmented surface coating and a speed sizing coating, each comprising clay and optionally comprising other pigments to at the topside of the base paper web, said coating having a clay content of less than 3.3 g/m$^2$ to obtain an average surface roughness $R_A$ of 1.0 μm or less;

applying at least one pigmented polymer resin layer on the topside of said coated base paper, the pigmented polymer resin coating is applied using melt extrusion of the polymer resin at a paper speed of at least 200 m/min; and calendaring the base paper before or after applying a coating to the base paper.

30. Process for producing a paper support for photographic printing paper, the process comprising:

providing a base paper web having a topside and a backside;

applying at least one of a pigmented surface coating and a speed sizing coating, each comprising clay and optionally comprising other pigments to at least the topside of the base paper web, said coating having a clay content of less than 3.3 g/m$^2$ to obtain an average surface roughness $R_A$ of 1.0 μm or less;

applying at least one pigmented polymer resin layer on the topside of said coated base paper, the pigmented polymer resin coating is applied at a paper speed of at least 300 m/min; and calendaring the base paper before or after applying a coating to the base paper.

31. Process for producing a paper support for photographic printing paper, the process comprising:

providing a base paper web having a topside and a backside;

applying at least one of a pigmented surface coating and a speed sizing coating, each comprising clay and optionally comprising other pigments to at least the topside of the base paper web, said coating having a clay content of less than 3.3 g/m$^2$ to obtain an average surface roughness $R_A$ of 1.0 μm or less;

applying at least one pigmented polymer resin layer on the topside of said base paper; and wherein the pigmented polymer resin coating is applied using melt extrusion of the polymer resin at a paper speed of at least 200 m/min.

32. Process for producing a paper support for photographic printing paper, the process comprising:

providing a base paper web having a topside and a backside;

applying at least one of a pigmented surface coating and a speed sizing coating, each comprising clay and optionally comprising other pigments to at least the topside of the base paper web, said coating having a clay content of less than 3.3 g/m$^2$ to obtain an average surface roughness $R_A$ of 1.0 μm or less;

applying at least one pigmented polymer resin layer on the topside of said base paper; and wherein the pigmented polymer resin coating is applied at a paper speed of at least 300 m/min.

* * * * *